United States Patent
Horikawa et al.

(10) Patent No.: US 10,574,906 B2
(45) Date of Patent: Feb. 25, 2020

(54) IMAGE PROCESSING APPARATUS AND IMAGE PROCESSING METHOD

(71) Applicant: CANON KABUSHIKI KAISHA, Tokyo (JP)

(72) Inventors: Yohei Horikawa, Tokyo (JP); Takeshi Ogawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 113 days.

(21) Appl. No.: 15/578,313

(22) PCT Filed: Jun. 1, 2016

(86) PCT No.: PCT/JP2016/002656
§ 371 (c)(1),
(2) Date: Nov. 30, 2017

(87) PCT Pub. No.: WO2016/199381
PCT Pub. Date: Dec. 15, 2016

(65) Prior Publication Data
US 2019/0222773 A1    Jul. 18, 2019

(30) Foreign Application Priority Data

Jun. 8, 2015 (JP) ................................ 2015-116025
May 9, 2016 (JP) ................................ 2016-094155

(51) Int. Cl.
*H04N 5/265* (2006.01)
*H04N 5/77* (2006.01)
*H04N 5/262* (2006.01)

(52) U.S. Cl.
CPC ........... *H04N 5/265* (2013.01); *H04N 5/2628* (2013.01); *H04N 5/772* (2013.01)

(58) Field of Classification Search
CPC ...... H04N 5/265; H04N 5/2628; H04N 5/772; H04N 5/783; H04N 5/22541; G02B 27/0075
See application file for complete search history.

(56) References Cited

U.S. PATENT DOCUMENTS 6,683,699 B1    1/2004 Ashizaki et al.
2008/0273099 A1 *  11/2008 Ono ................... H04N 5/23212
348/241

(Continued)

FOREIGN PATENT DOCUMENTS

CN    101321299 A    12/2008
CN    102104786 A    6/2011

(Continued)

OTHER PUBLICATIONS

The US and foreign references 1 and 3-5 were cited the International Search Report of International Application No. PCT/US2016/002656 dated Aug. 30, 2016.

(Continued)

*Primary Examiner* — Shahbaz Nazrul
(74) *Attorney, Agent, or Firm* — Cowan, Liebowitz & Latman, P.C.

(57) ABSTRACT

Disclosed are an image processing apparatus that can generate a moving image having a movement shooting effect with a simple configuration and an image processing method. The image processing apparatus combines a plurality of parallax images in units of frames in accordance with a combining ratio, and generates moving image data in which an image obtained by the combining is included in frames. The image processing apparatus controls the combining ratio so as to temporally change in the moving image data.

24 Claims, 12 Drawing Sheets

(56) References Cited

U.S. PATENT DOCUMENTS

| | | | | |
|---|---|---|---|---|
| 2011/0267533 | A1* | 11/2011 | Hirose | H04N 5/23212 348/345 |
| 2012/0249852 | A1* | 10/2012 | Fukuda | H01L 27/14605 348/311 |
| 2014/0184853 | A1* | 7/2014 | Ogawa | H04N 27/14605 348/239 |
| 2014/0211075 | A1* | 7/2014 | Inoue | G02B 7/28 348/349 |
| 2014/0354781 | A1* | 12/2014 | Matsuyama | H04N 5/23212 348/49 |

FOREIGN PATENT DOCUMENTS

| | | |
|---|---|---|
| CN | 102177722 A | 9/2011 |
| CN | 102378024 A | 3/2012 |
| CN | 103685922 A | 3/2014 |
| JP | 2012-191351 A | 10/2012 |
| JP | 2013-175805 A | 9/2013 |
| JP | 2014-112783 A | 6/2014 |
| JP | 2015-046019 A | 3/2015 |
| WO | 2010/041450 A1 | 4/2010 |
| WO | WO2016/199381 A1 | 12/2016 |

OTHER PUBLICATIONS

PCT/IB/326 (PCT Notification Concerning Transmittal of International Preliminary Report on Patentability).
PCT/IB/373 (PCT International Preliminary Report on Patentability).
PCT/ISA/237 (PCT Written Opinion of the International Searching Authority).
PCT/ISA/210 (PCT International Search Report).
PCT/ISA/220 (PCT Notification Concerning Transmittal of the International Search Report).
PCT Request for PCT/JP2016/002056.
Aug. 29, 2019 Chinese Office Action, with an English Translation, that issued in Chinese Patent Application No. 201680033676.8.

* cited by examiner

[Fig. 1]
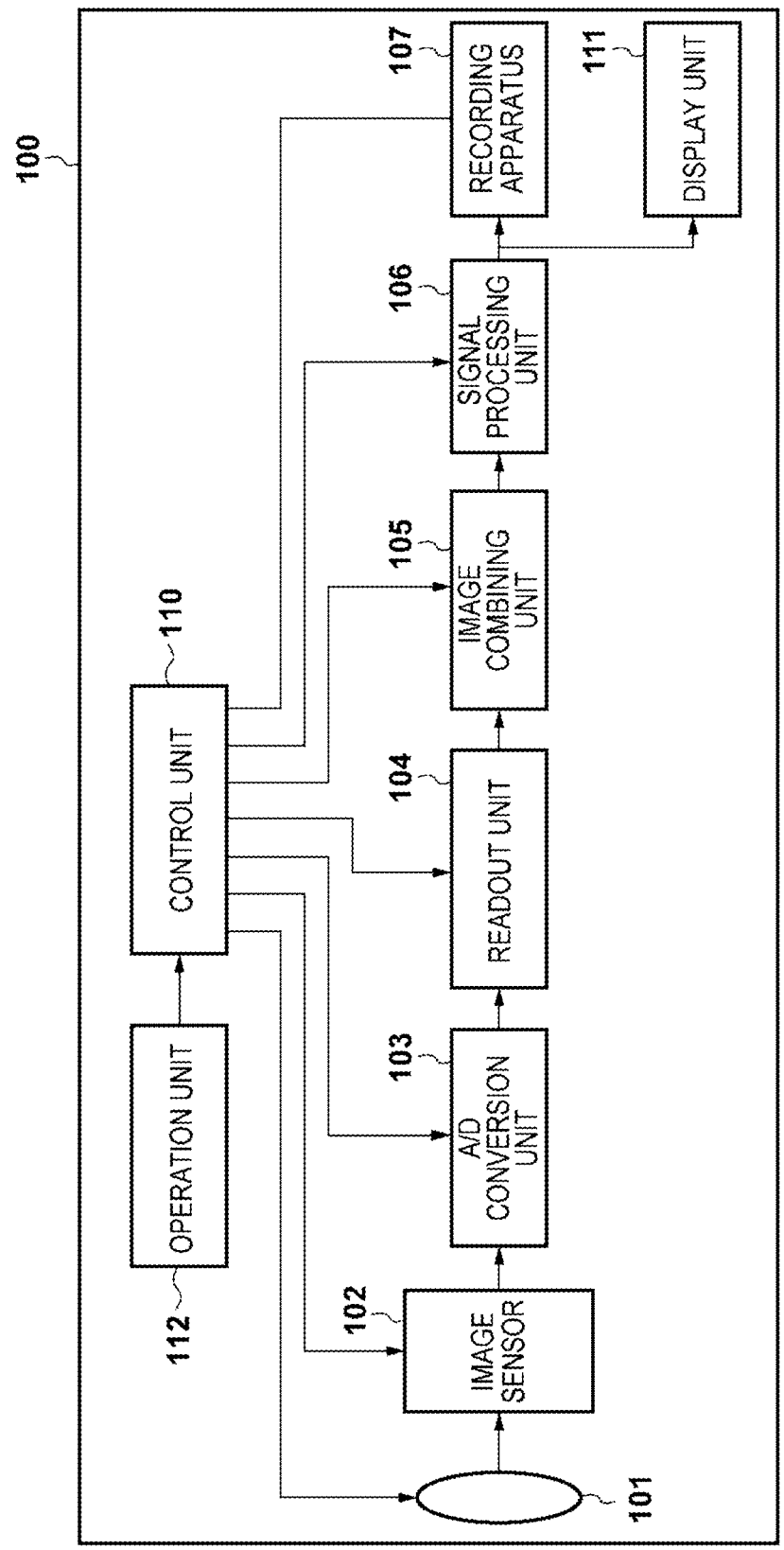

[Fig. 2A]
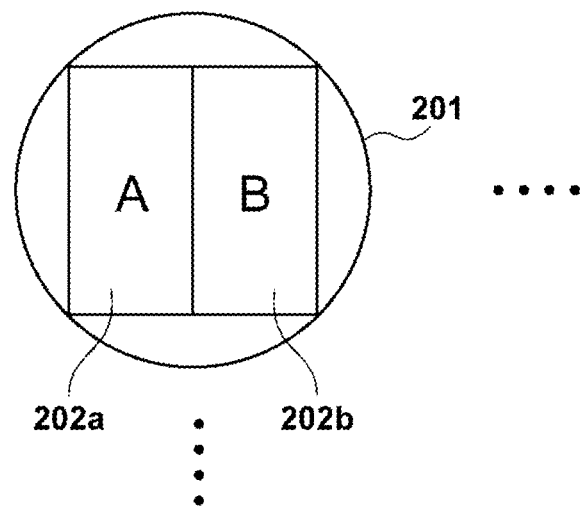
[Fig. 2B]
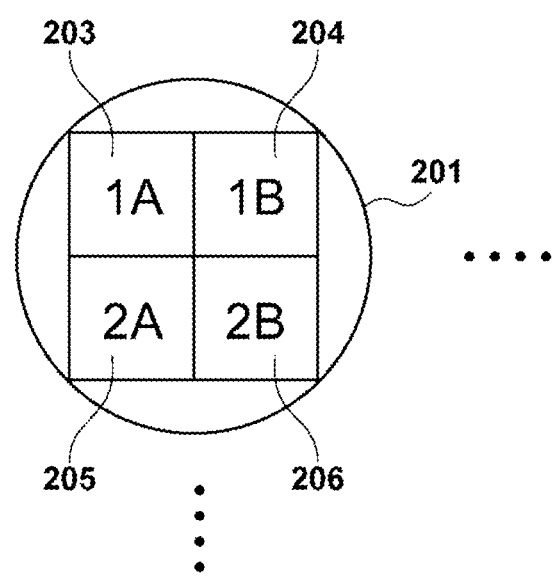

[Fig. 3]
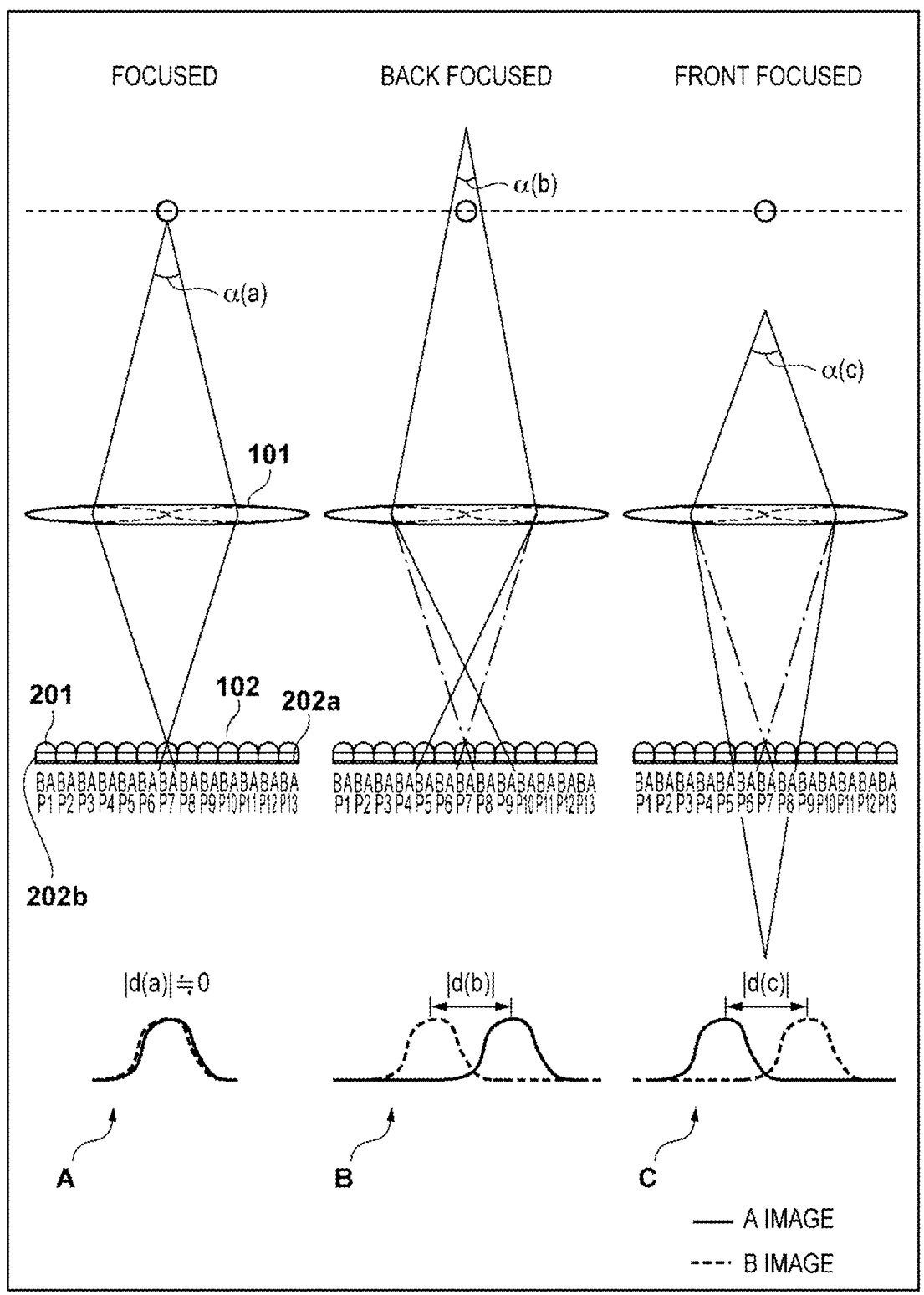

[Fig. 4]
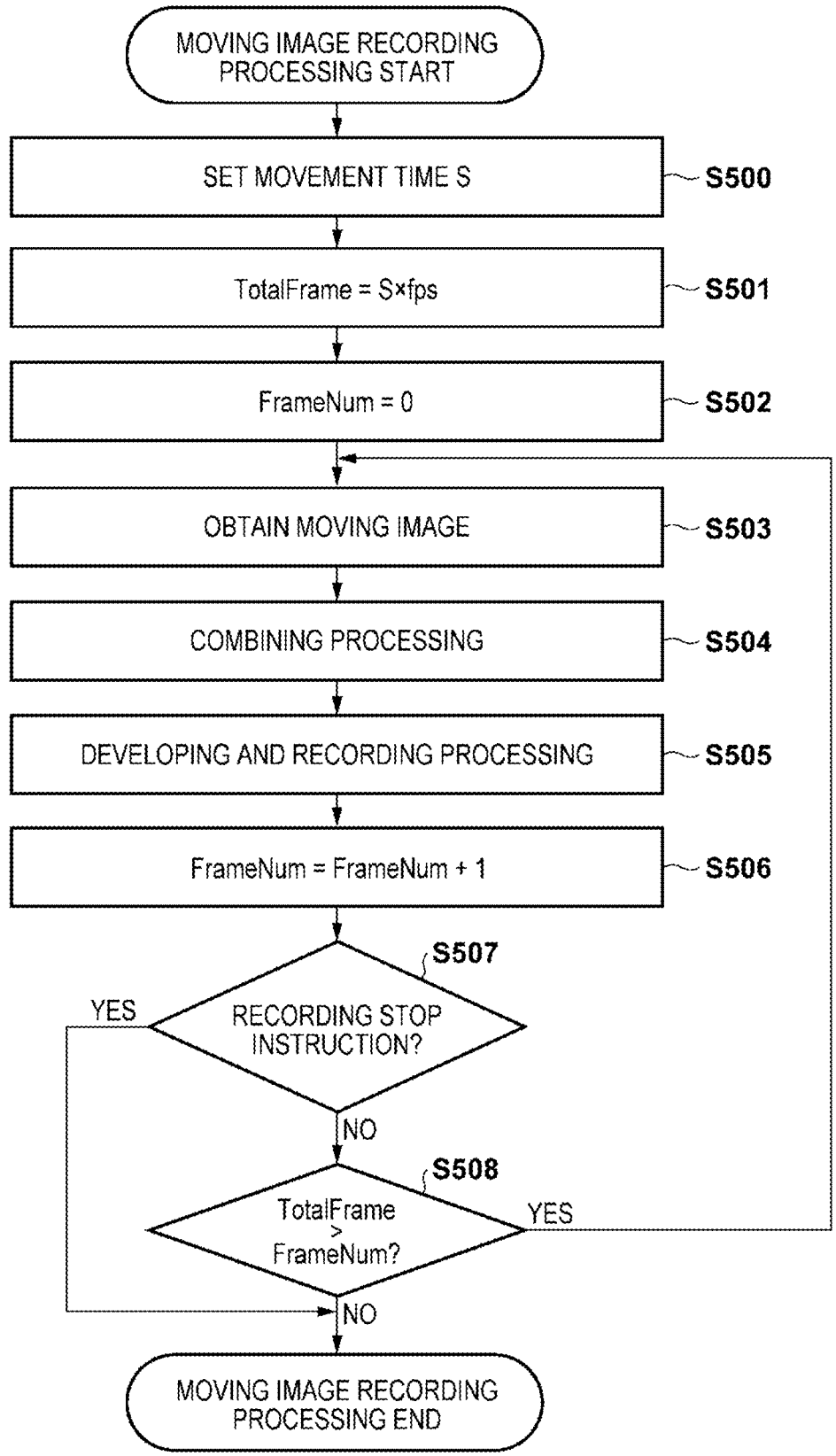

[Fig. 5]
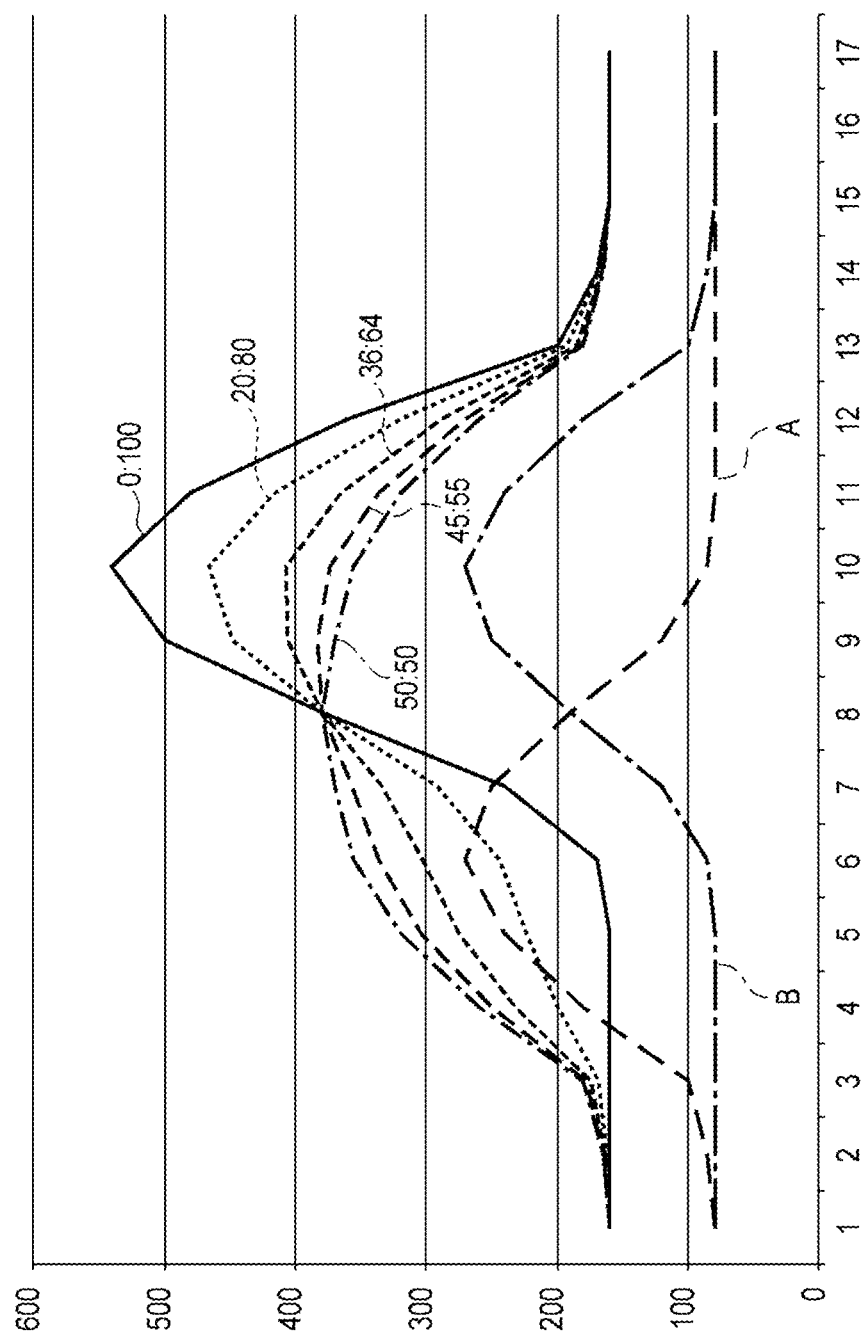

[Fig. 6A]
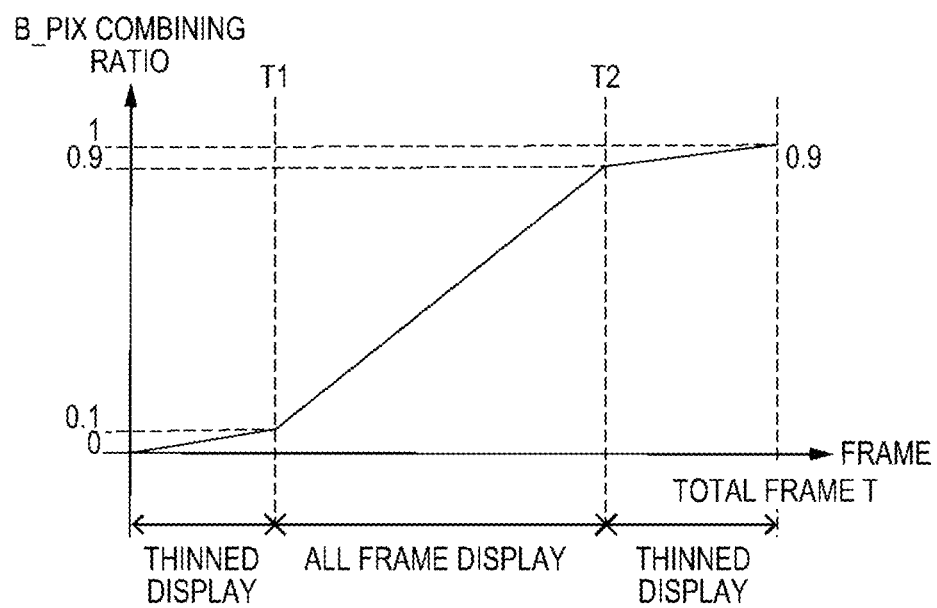
[Fig. 6B]
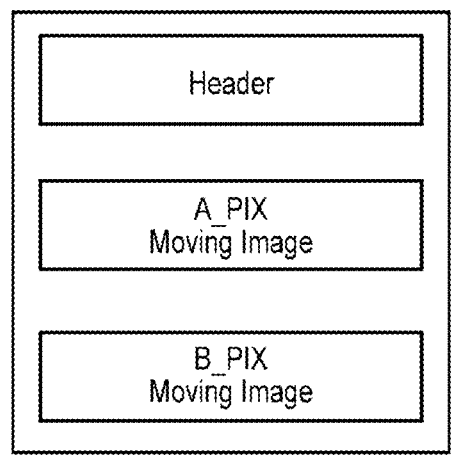

[Fig. 7A]
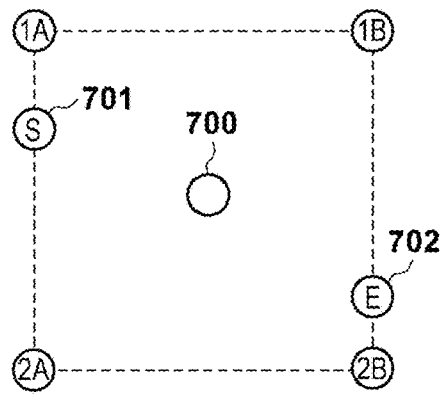
[Fig. 7B]
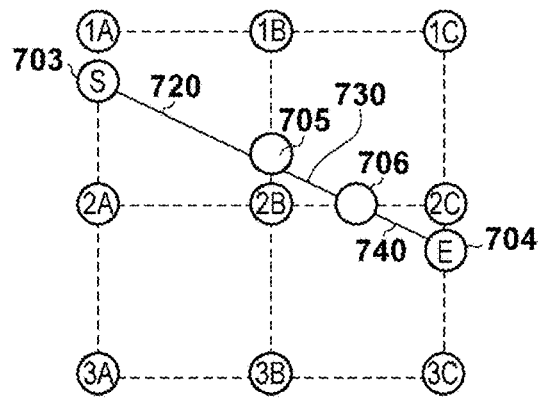
[Fig. 7C]
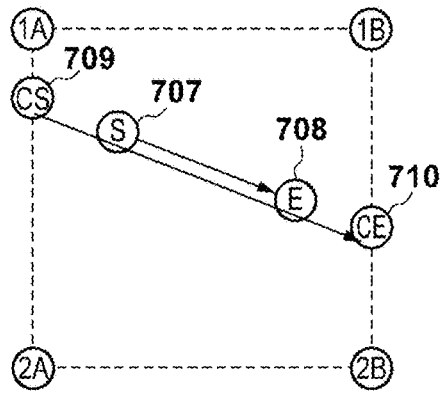
[Fig. 7D]
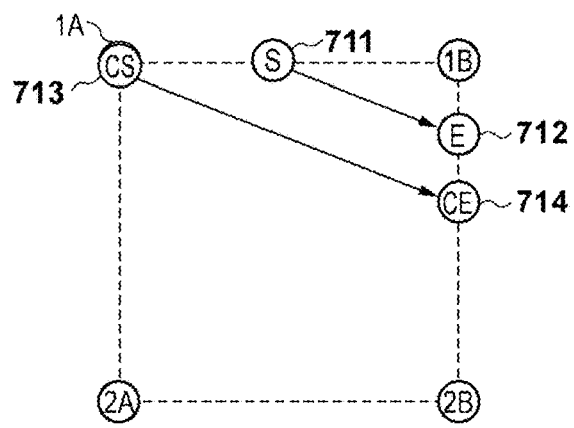

[Fig. 8A]
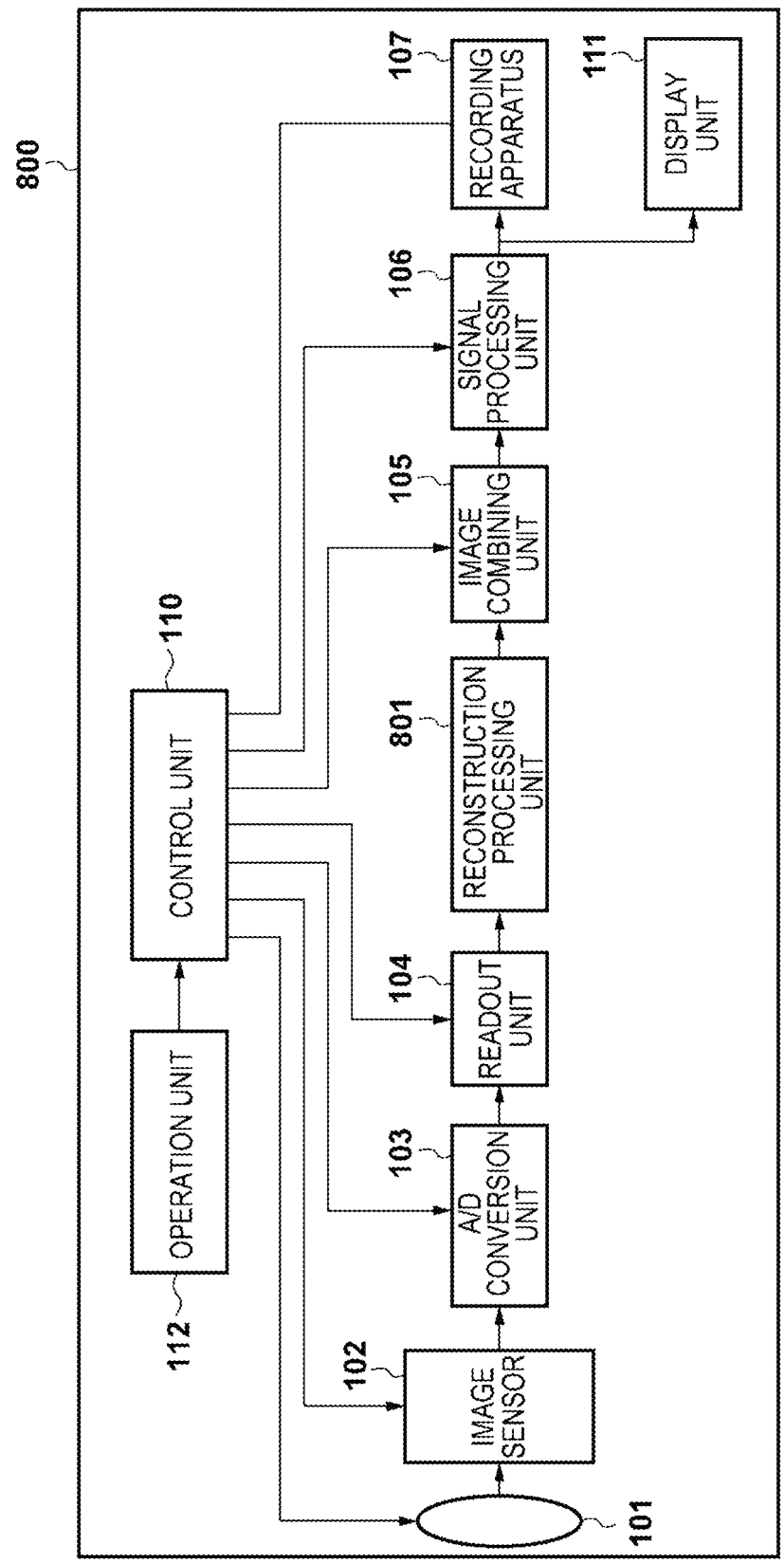

[Fig. 8B]
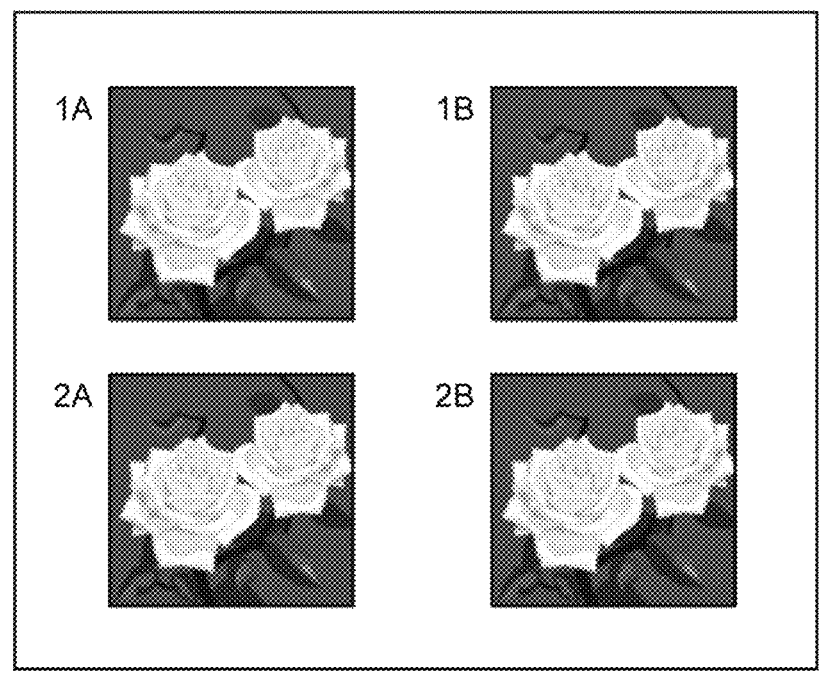

[Fig. 9A]
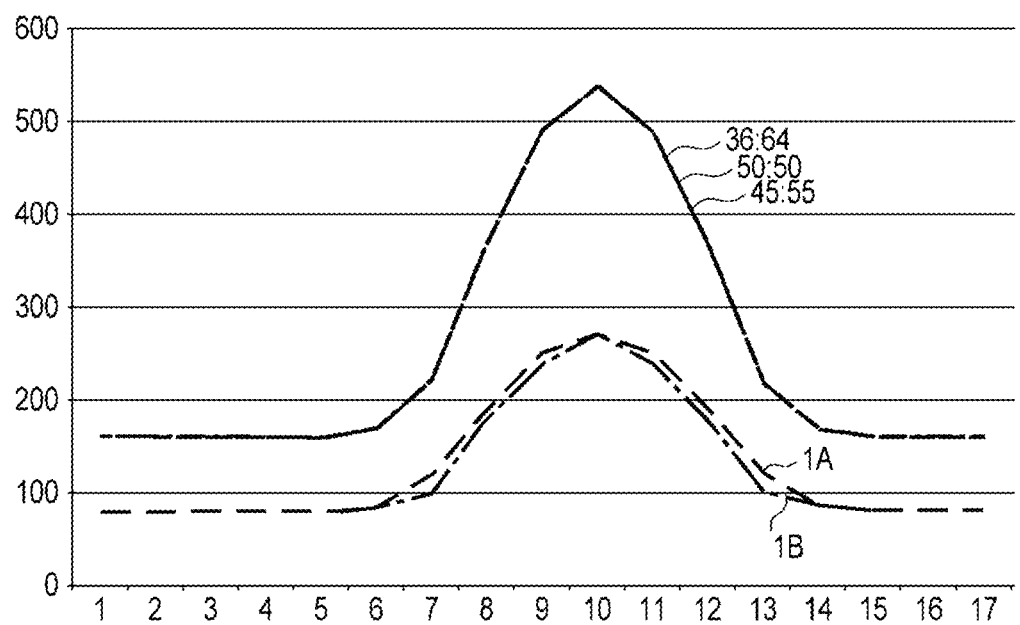
[Fig. 9B]
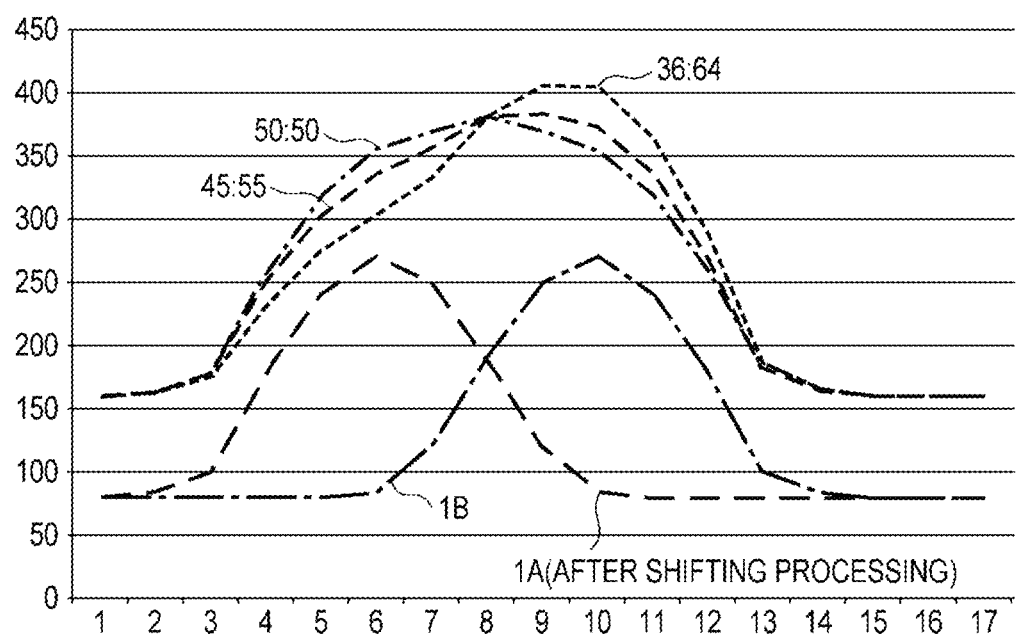

[Fig. 10]
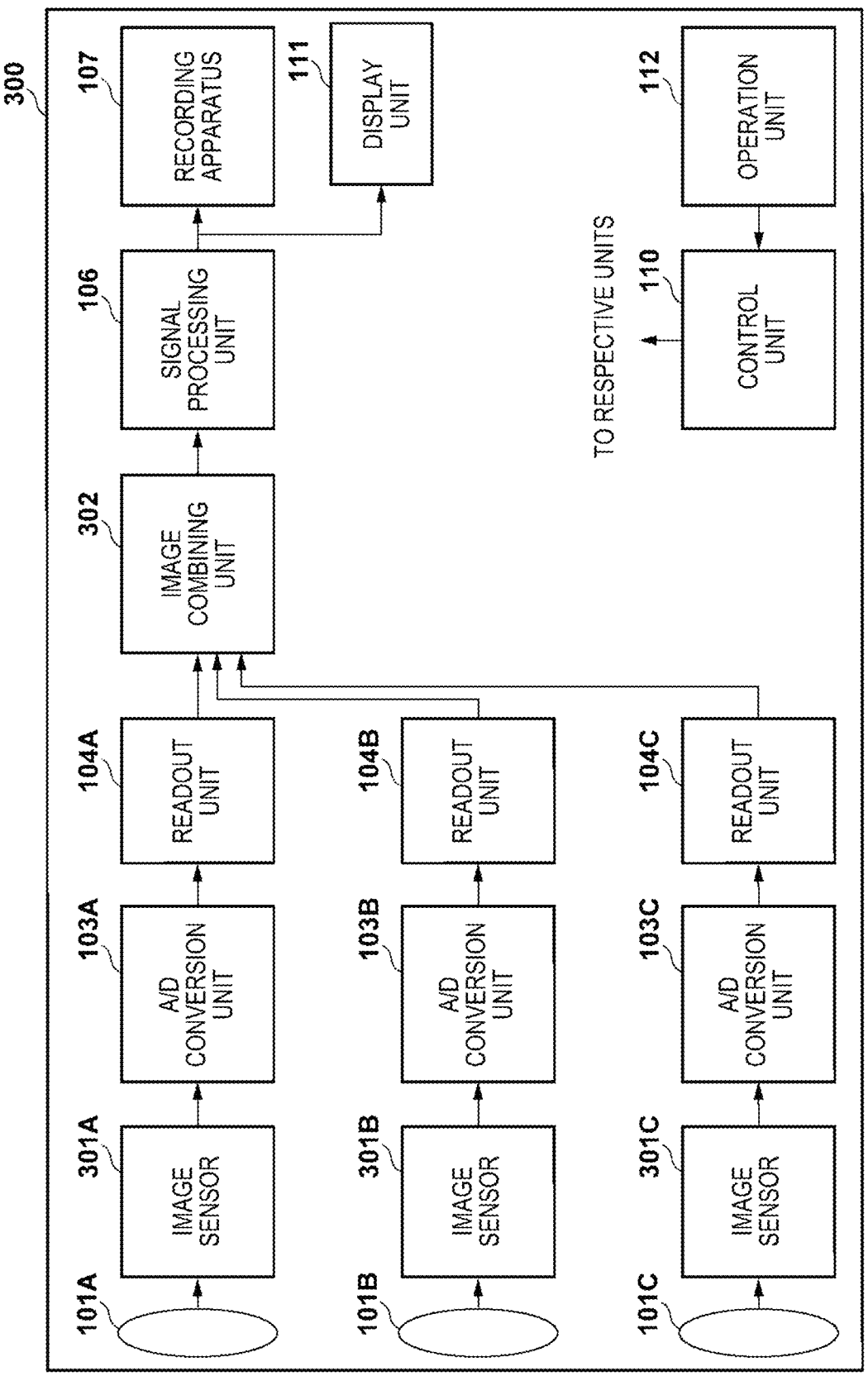

[Fig. 11]
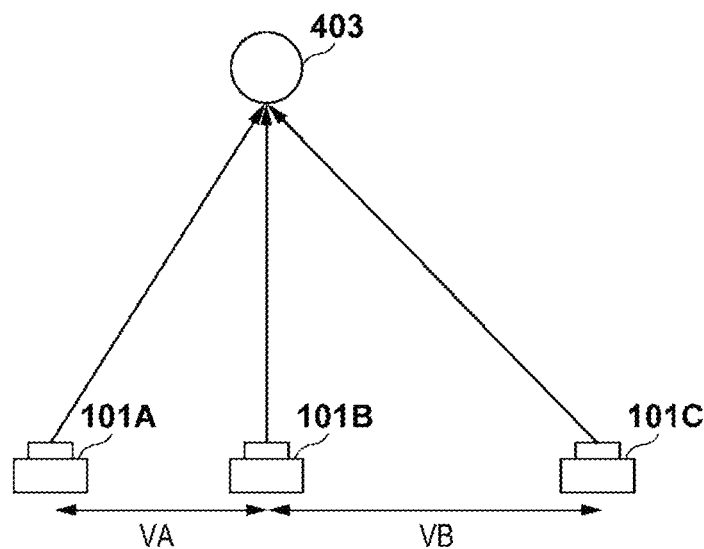
[Fig. 12]
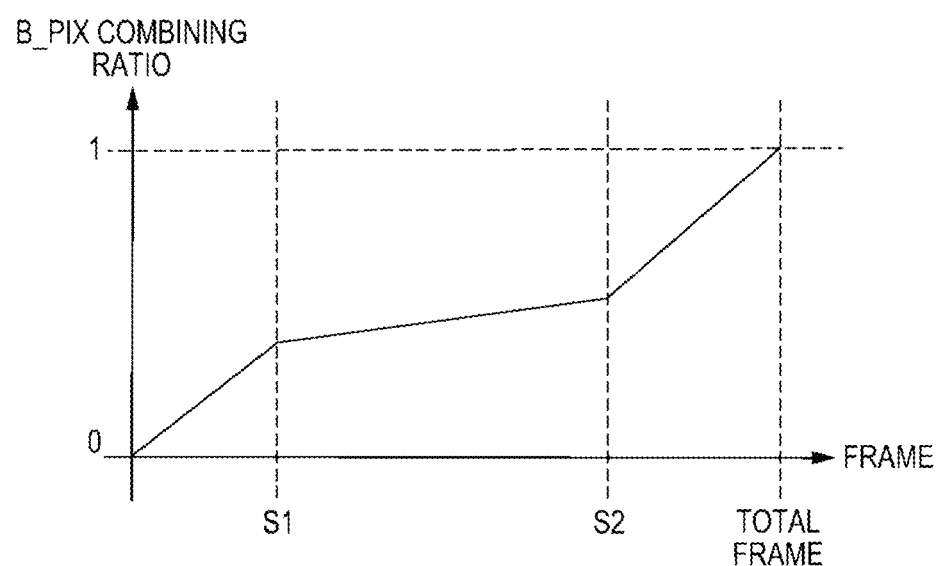

IMAGE PROCESSING APPARATUS AND IMAGE PROCESSING METHOD

CROSS-REFERENCE TO RELATED APPLICATIONS

This application is a national stage application of International Application No. PCT/JP2016/002656 filed Jun. 1, 2016, whose benefit is claimed and which claims the benefit of Japanese Patent Application Nos. 2015-116025, filed Jun. 8, 2015 and 2016-094155, filed May 9, 2016, the entire disclosures of which are incorporated herein by reference.

TECHNICAL FIELD

The present invention relates to an image processing apparatus and an image processing method, and in particular relates to a technique for generating a moving image having a viewpoint movement effect.

BACKGROUND ART

As a technique for shooting a moving image in which the viewpoint moves smoothly, techniques such as tracking and dollying for shooting while moving a camera mounted on a dolly are known. However, shooting while moving requires a dolly for mounting the camera and rails for moving the dolly in a certain direction, and was not easy for a general camera user to implement.

Meanwhile, a technology for generating a still image at a virtual viewpoint using a plurality of parallax images obtained at the same timing is known (Japanese Patent Laid-Open No. 2012-191351).

However, in moving image shooting and moving image editing, there was previously no technique that considered viewpoint movement using parallax images.

SUMMARY OF INVENTION

The present invention has been made in light of such problems, and provides an image processing apparatus that can generate a moving image having a movement shooting effect with a simple configuration, and an image processing method.

According to an aspect of the present invention, there is provided an image processing apparatus comprising: obtaining means for obtaining a plurality of parallax images; combining means for combining the plurality of parallax images in units of frames in accordance with a combining ratio and generating moving image data of which frames include images obtained by the combining; and control means for controlling the combining ratio, wherein the control means controls the combining ratio so as to temporally change in the moving image data.

According to another aspect of the present invention, there is provided an image processing apparatus comprising: obtaining means for sequentially obtaining a plurality of parallax images output from an image sensor in which unit pixels each having a plurality of subpixels that share a microlens are two-dimensionally arranged; combining means for combining the plurality of parallax images in units of frames in accordance with a combining ratio and generating moving image data of which frames include images obtained by the combining; and control means for controlling the combining ratio, wherein the control means controls the combining ratio so as to temporally change in the moving image data.

According to a further aspect of the present invention, there is provided an image capture apparatus comprising: the image processing apparatus according to the present invention, wherein the obtaining means has an image sensor.

According to another aspect of the present invention, there is provided an image processing method comprising: obtaining a plurality of parallax images; combining the plurality of parallax images in units of frames in accordance with a combining ratio and generating moving image data in which an image obtained by the combining is included in frames; and controlling the combining ratio, wherein in the controlling, the combining ratio is controlled so as to temporally change in the moving image data.

According to a farther aspect of the present invention, there is provided an image processing method comprising: sequentially obtaining a plurality of parallax images output from an image sensor in which unit pixels each having a plurality of subpixels that share a microlens are two-dimensionally arranged; combining the plurality of parallax images in units of frames in accordance with a combining ratio and generating moving image data in which an image obtained by the combining is included in frames; and controlling the combining ratio, wherein in the controlling, the combining ratio is controlled so as to temporally change in the moving image data.

According to another aspect of the present invention, there is provided a program for causing a computer to function as each of the units of the image processing apparatus according to the resent invention.

Further features of the present invention will become apparent from the following description of exemplary embodiments with reference to the attached drawings.

BRIEF DESCRIPTION OF DRAWINGS

FIG. 1 is a block diagram schematically showing an example of a functional configuration of a digital camera according to a first embodiment.

FIG. 2A is a diagram showing a configuration example of a unit pixel arranged in an image sensor in the embodiments.

FIG. 2B is a diagram showing a configuration example of a unit pixel arranged in an image sensor in the embodiments.

FIG. 3 is a diagram for describing a principle according to which parallax images are obtained by the image sensor in the embodiments.

FIG. 4 is a flowchart showing the outline of moving image recording processing performed by the digital camera according to the embodiments.

FIG. 5 is a diagram for describing the obtaining of a viewpoint movement effect by performing combining processing of the embodiments.

FIG. 6A is a diagram related to variations in the first embodiment.

FIG. 6B is a diagram related to variations in the first embodiment.

FIG. 7A is a diagram for describing a relationship between the centroid position of each subpixel and a viewpoint in a second embodiment.

FIG. 7B is a diagram for describing a relationship between the centroid position of each subpixel and a viewpoint in a second embodiment.

FIG. 7C is a diagram for describing a relationship between the centroid position of each subpixel and a viewpoint in a second embodiment.

FIG. 7D is a diagram for describing a relationship between the centroid position of each subpixel and a viewpoint in a second embodiment.

FIG. 8A is block diagram schematically showing an example of a functional configuration of a digital camera according to a third embodiment.

FIG. 8B is a block diagram schematically showing an example of a functional configuration of a digital camera according to a third embodiment.

FIG. 9A is a diagram for describing an effect of a reconstruction processing unit of the third embodiment.

FIG. 9B is a diagram for describing an effect of a reconstruction processing unit of the third embodiment.

FIG. 10 is a block diagram schematically showing an example of a functional configuration of a multi-eye camera according to a fourth embodiment.

FIG. 11 is a diagram related to the fourth embodiment.

FIG. 12 is a diagram showing an example of a combining ratio in a fifth embodiment.

DESCRIPTION OF EMBODIMENTS

Preferred embodiments of the present invention will now be described in detail in accordance with the accompanying drawings.

First Embodiment

An exemplary embodiment of the present invention will be described below with reference to the drawings. Note that a configuration will be described below in which the present invention is applied to, as an example of an image processing apparatus, a digital camera capable of obtaining parallax images by performing shooting. However, the present invention is not limited to a configuration in which parallax images are obtained by performing shooting, and parallax images can be obtained by a suitable method such as reading out parallax images stored in advance from a storage apparatus, or obtaining parallax images from another communicable device. Therefore, in the present invention, a shooting function is not essential, and the present invention can be implemented by general electronic devices. Such electronic devices include personal computers, tablet computers, smart phones, mobile phones, game machines, wearable terminals and the like, but the present invention is not limited thereto.

FIG. 1 a block diagram schematically showing an example of the functional configuration of a digital camera 100 according to a first embodiment of the present invention.

An optical system unit 101 is constituted by an imaging optical system including a focusing lens and a zoom lens, a mechanical shutter, a diaphragm and the like, and forms an optical image on an image sensor 102.

In the image sensor 102, which is a CCD or CMOS image sensor, unit pixels are arranged in a two-dimensional matrix shape. As will be described later, each of the unit pixels of the image sensor 102 has one microlens and a plurality of photoelectric conversion areas (hereinafter, referred to as subpixels), and a signal can be read out for each subpixel. In this embodiment, two subpixels are included per unit pixel. Assuming the two subpixels are an A pixel and a B pixel, an image formed by the output of a group of A pixels and an image formed by the output of a group of B pixels are each a parallax image. The configuration of a unit pixel and a principle according to which the parallax images are obtained will be described later in detail.

An optical image formed by the optical system unit 101 is photoelectrically converted using the pixels of the image sensor 102. Accumulated electric charges that were photoelectrically converted are read out for each subpixel, and input to an A/D conversion unit 103.

The A/D conversion unit 103 performs analog signal processing such as correlated double sampling (CDS) and nonlinear amplification on analog signals read out from the image sensor 102, then converts the analog signals into digital signals, and outputs the digital signals to a readout unit 104.

The readout unit 104 distinguishes image signals output by the A/D conversion unit 103 into subpixels of each type, and outputs an image (A image) constituted by the output of the A pixels and an image (B image) constituted by the output of the B pixels to an image combining unit 105.

The image combining unit 105 combines the A image and the B image in units of frames at a combining ratio determined based on a viewpoint moving time that was set in advance, and outputs a combined image.

A signal processing unit 106 performs signal processing such as white balance adjustment, demosaic (color interpolation) processing and encoding processing on the combined image, and stores encoded moving image data to a data file in a predetermined format, and outputs the data file to a recording apparatus 107.

The recording apparatus 107 records the data file output from the signal processing unit 106. The recording apparatus may be a nonvolatile memory incorporated in the digital camera 100, or a memory card removable from the digital camera 100. A configuration may also be adopted in which the data file is transmitted to an external device via wireless communication or the like.

A control unit 110 has a programmable processor such as a CPU, a ROM, and a RAM, and by loading a program stored in the ROM to the RAM and the CPU executing the program so as to control the operations of the units, the functions of the digital camera 100 are realized.

A display unit 111 is generally a color LCD, and is used as a viewfinder and for displaying various types of information of the digital camera, GUIs such as menu screens and messages, captured images and the like.

An operation unit 112 has input devices such as a power supply switch, a release button, a menu button, direction keys, an execution key and a mode setting dial, and is used for a user to input instructions and settings to the digital camera 100.

Note that the configuration shown in FIG. 1 is not comprehensive, and does not exclude the existence of other constituent elements.

Configuration of Unit Pixels

Next, the unit pixels arranged in the image sensor 102 in this embodiment will be described briefly. FIG. 2A is a plan view of a unit pixel viewed from the image capture plane side, and the unit pixel has two subpixels (photoelectric conversion areas) 202a and 202b that share one microlens 201. In other words, the unit pixel has a configuration in which a photoelectric conversion area of a normal pixel is equally divided into two horizontally. Here, for the sake of convenience, the subpixel 202a is referred to as an A pixel, and the subpixel 202b is referred to as a B pixel.

In the image sensor 102 of this embodiment, unit pixels having the configuration shown in FIG. 2A are two-dimensionally arranged. Note that although not shown in FIG. 2A, each unit pixel is provided with a color filter. In this embodiment, a color filter corresponding to one color out of the three color red (R), green (G) and blue (B) is provided in each unit pixel such that the color filters form a primary color Bayer pattern. Hereinafter, unit pixels having a color filter of the same color may be referred to as same color pixels.

The microlens 201 and the exit pupil of the imaging optical system are in a conjugate relationship, and thus dividing the photoelectric conversion area corresponding to the microlens 201 into a plurality of subpixels corresponds to pupil division. Therefore, an image constituted by the output of a group of A pixels and an image constituted by the output of a group of B pixels constitute a pair of parallax images. Parallax moving image data can be obtained by sequentially obtaining pairs of parallax images that are consecutively shot using an electronic shutter.

Relationship Between Degree of Focusing and Parallax Amount

The principle according to which parallax images are obtained will be further described with reference to FIG. 3.

FIG. 3 schematically shows the relationship of the shift amount (phase difference) between the A image and the B image obtained on a given pixel line, regarding three states, namely a focused state, a back focused state (the focal point is behind the subject) and a front focused state (the focal point is in front of the subject). Here, the A image corresponds to image signals obtained from the output of the A pixels for a plurality of unit pixels included in the pixel line, and the B image corresponds to image signals obtained from the output of the B pixels for a plurality of unit pixels included in the pixel line. Note that the A image and the B image are each constituted by the output of same color pixels.

In a focused state A, the position at which the optical system unit 101 forms an image is the position of a unit pixel P7, regarding both the A pixels and the B pixels. Therefore, the levels of the A image and the B image both reach a local maximum at the unit pixel P7, and parallax |d(a)| is substantially 0.

In a back focused state B, the position at which the optical system unit 101 forms an image is the position of a unit pixel P9 regarding the A pixels, and a unit pixel P5 regarding the B pixels. Therefore, the positions at which the levels of the A image and the B image reach a local maximum are different, and parallax |d(b)| occurs.

In a front focused state C, the position at which the optical system unit 101 forms an image is the position of the unit pixel P5 regarding the A pixels and the position of the unit pixel P9 regarding the B pixels. Therefore, the positions at which the levels of the A image and the B image reach a local maximum are different, and parallax |d(c)| that is opposite to the parallax |d(b)| occurs.

In other words, regarding the parallax images obtained by the digital camera 100 of this embodiment, there is no parallax in a portion that is in focus, and in a portion with blur, as the amount of blur of a portion increases, the parallax that the portion has increases.

Moving Image Recording Processing

Next, the outline of moving image recording processing performed by the digital camera 100 will be described with reference to the flowchart in FIG. 4. Note that the processing shown in FIG. 4 is set so as to impart a viewpoint movement effect to a moving image that was shot, and is performed when a moving image recording start instruction is input, such as when a moving image shooting button included in the operation unit 112 is pressed in a shooting stand-by state.

Steps S500 to S502 constitute initialization processing.

In step S500, the control unit 110 sets a movement time S. For example, the movement time S may be a value set by the user through the operation unit 112, or a predetermined value.

In step S501, the control unit 110 multiplies a predetermined frame rate (fps) of a moving image by the movement time S so as to obtain the total number of frames to which a movement shooting effect is to be imparted, and sets a variable TotalFrame to this value.

In step S502, the control unit 110 initializes the value of a variable FrameNum used as a counter for the number of frames to 0.

When initialization processing ends, the control unit 110 starts a moving image recording operation. Note that although detailed description is omitted, the control unit 110 performs automatic exposure control and automatic focus detection processing that are based on the luminance information of a shot image, while controlling an operation of shooting each of the frame images of a moving image.

In step S503, for each partial pixel, the control unit 110 reads out, from the image sensor 102, analog image signals that are based on electric charges accumulated during an exposure period determined by automatic exposure control, and supplies a pair of parallax images (an A image and a B image) to the A/D conversion unit 103. The A/D conversion unit 103 converts the analog image signals into digital image signals, and supplies the digital image signals to the readout unit 104. The readout unit 104 distinguishes the digital image signals output from the A/D conversion unit 103 into subpixels of each type, and outputs an image (A image) constituted by the output of the A pixels and an image (B image) constituted by the output of the B pixels to the image combining unit 105. In this manner, a plurality of parallax image data pieces are sequentially supplied to the image combining unit 105 (the moving image data of the A image and the moving image data of the B image), and the image combining unit 105 combines the plurality of parallax image data pieces in units of frames. Here, in the case of attempting to realize the movement shooting effect by applying the technique of Japanese Patent Laid-Open No. 2012-191351 to each frame of the moving image, it is necessary to determine the position of a virtual viewpoint for each of the frames, and calculate a combining ratio of the parallax images from the positional relationship between the determined virtual viewpoint and a plurality of nearby shooting viewpoints. Therefore, if the technique of Japanese Patent Laid-Open No. 2012-191351 is implemented on each of the frames that exist generally at 30 to 60 frames per second in a moving image, the calculation amount increases greatly, and the processing load is large. In view of this, in this embodiment, a combining method such as described below is used.

In step S504, the image combining unit 105 combines an A image A_PIX and a B image B_PIX in accordance with Expression (1) below, and generates an output image OUT_PIX.

$$\text{OUT\_PIX} = (2 \times (\text{TotalFrame} - \text{FrameNum}) \times A\_PIX + 2 \times \text{FrameNum} \times B\_Pix)/\text{TotalFrame} \qquad (1)$$

Specifically, the values of the pixels at the same position in the A image and B image are weighted and added in accordance with Expression (1) so as to obtain a pixel value at the same position in the output image, and thereby the combining of the A image and B image is realized.

As is evident from Expression (1), in this embodiment, combining processing is performed while linearly changing the weight of one frame from a state in which the weight of the A image is the maximum (=1) and the weight of the B image is the minimum (=0) to a state in which the weight of the A image is the minimum (=0) and the weight of the B image is the maximum (=1). Therefore, it is possible to impart a viewpoint movement effect to the moving image, without needing to calculate a virtual viewpoint position of each frame image, or calculate a combining coefficient from the relationship between a virtual viewpoint position and a nearby shooting start position.

Here, imparting a viewpoint position movement effect based on the addition of the values of pixels according to Expression (1) will be described with reference to FIG. 5.

FIG. 5 shows examples of the waveforms of an A image and a B image obtained regarding a certain subject and combined images obtained by combining (adding) the A image and the B image at different ratios (weights). The horizontal axis indicates the pixel position in the horizontal direction, and the vertical axis indicates the pixel value.

The A image and the B image have an image shifting amount (parallax amount) for four pixels, and the case of A:B=50:50 involves a simple addition output (output corresponding to normal pixels). As the weight of the B image increases to 45:55, 36:64, 20:80 and 0:100 from 50:50, the centroid (local maximum) position of the combined pixel gradually approaches the centroid (local maximum) position of the B image. Similarly, in the case where the weight of the A image is increased, the centroid position of the combined image approaches the centroid position of the A image. In other words, it can be seen that a contour position of the combined image gradually moves from a contour position of the A image to a contour position of the B image due to combining ratio control based on Expression (1). This is the same as moving the viewpoint, and thus corresponds to imparting the movement shooting effect to a moving image.

Returning to FIG. 4, in step S505, the signal processing unit 106 applies so-called developing processing such as white balance adjustment and demosaic (color interpolation) processing and signal processing such as encoding processing that depends on a recording format to the combined image. The signal processing unit 106 also stores the encoded moving image data to a data file of a predetermined format and outputs the data file to the recording apparatus 107. The recording apparatus 107 records the data file output from the signal processing unit 106.

In step S506, the control unit 110 updates the value of the variable FrameNum by adding one.

In step S507, the control unit 110 determines whether or not an instruction to stop recording of the moving image has been input, such as by the moving image shooting button being pressed. If such an instruction has been input, moving image recording processing is ended, and if such an instruction has not been input, the procedure is advanced to S508.

In step S508, the control unit 110 compares the values of the variables FrameNum and TotalFrame, and if the value of the variable FrameNum is smaller than the value of the variable TotalFrame, returns the procedure to S503 where processing on the next frame is performed. On the other hand, in the case where the value of the variable FrameNum is equal to the value of the variable TotalFrame, the control unit 110 determines that the processing on frames for the specified movement time S is completed, and ends the moving image recording processing.

Note that here, for ease of understanding and description, processing of shooting and recording a moving image that has a specific length and to which the viewpoint movement effect is imparted was described. However, a configuration may be adopted in which if during a normal moving image recording operation in which the viewpoint movement effect is not imparted, an effect imparting button included in the operation unit 112 is pressed, the viewpoint movement effect is imparted during the predetermined time S from that point on. It is also possible to record parallax moving image data (moving image data of the A image and moving image data of the B image), and the viewpoint movement effect is then imparted during editing or reproduction after the shooting. In an editing/reproduction application, it is sufficient that the user sets a section to which the viewpoint movement effect is to be imparted, the frames are correlated to each other using a time code that is obtained from the header of the moving image or the like, and the combining ratio is controlled using frame rate information and the length of the section that is set.

For ease of understanding and description, the case of moving the viewpoint from one of the shooting viewpoints of a pair of parallax images to the other (i.e., over the entire convergence angle) was also described. However, the present invention is not necessarily limited to a mode in which a viewpoint is moved over the entire convergence angle, and a mode may be adopted in which a viewpoint is moved over a suitable range of the convergence angle. In the case of moving the viewpoint over a portion of the convergence angle, the present invention is not limited as to how to determine the start point and the end point of the range, and a suitable technique may be used. It is sufficient that the combining ratio is changed between the initial value and the final value of the combining ratio that correspond to the start point and the end point of the range.

Here, as an example, a configuration was also described in which the viewpoint is moved every frame. However, a configuration may be adopted in which the viewpoint is moved every plurality of frames, such as moving the viewpoint every two frames. Note that the number of frames is set within a predetermined range in which the viewpoint can be visually recognized as moving smoothly.

Here, as an example, the case was also described in which the combining ratio is calculated by linear interpolation, and the viewpoint moving speed is kept constant. However, a configuration may also be adopted in which the speed is gradually increased or decreased by controlling the combining ratio change amount per unit time.

Note that the smaller the F-number of the imaging optical system of the optical system unit 101 is (the larger the opening of the diaphragm is), the narrower the focusing range becomes, and thus the parallax amount of the parallax image can be increased and a viewpoint movement range can be widened. Therefore, during moving image shooting for imparting the viewpoint movement effect, control may be performed so as to open the diaphragm (decrease the F-number).

According to this embodiment, when sequentially combining a plurality of parallax images, or combining a plurality of parallax moving image data pieces between corresponding frames so as to generate moving image data, the viewpoint position movement effect can be imparted by temporally changing the combining ratio of the plurality of parallax images. It is possible to obtain the combining ratio based only on the number of frames (or the time) related to the movement, and thus even in the case where the computing load is small and the processing time per frame is short as in the case of a moving image, the computing performance required for adding the movement effect can be suppressed to a low level. Moreover, it is not necessary to use a large-scale apparatus such as a dolly or rails, and therefore the present invention is useful in terms of cost.

Variation 1

Note that in this embodiment, a configuration was described in which one type of variable FrameNum is used, but the viewpoint movement effect may be dynamically changed by dynamically changing the amount of change of the variable FrameNum.

For example, the combining ratio can be changed in accordance with the relationship between the frame rate of the moving image and the display frame rate, such as the display speed or the proportion of frames that are displayed among the frames in the moving image. Specifically, by increasing the change in the variable FrameNum in a section in which slow motion display is to be performed over the change in variable in a section in which normal display is to be performed, video representation such as so-called bullet-time can be realized in a pseudo manner.

A specific example will be described in which the change amount of the variable FrameNum is dynamically changed. In FIG. 6A, the vertical axis indicates the combining ratio of the B image B_PIX, and the horizontal axis indicates the number of frames (or time).

Here, it is assumed that moving image shooting is performed at 120 fps and the display frame rate of the display unit 111 is 30 fps. Therefore, for example, if the moving image is displayed with the number of frames having been thinned to one fourth such as by displaying every fourth frame, the display is performed at a normal speed, and if all the frames are displayed, the display is performed at one fourth of the normal speed. In the example of FIG. 6A, the case is shown in which the total number of frames TotalFrame to which the shooting viewpoint movement effect is to be imparted is divided into three, frames are thinned to one fourth and displayed until a number of frames T1, all the frames are then displayed until a number of frames T2, and thereafter frames are again thinned to one fourth and displayed until the total number of frames TotalFrame. In the section in which all the frames are displayed, a slow motion effect is obtained.

By setting the change amount of the variable FrameNum in the all frame display section to a higher value than in the thinning display section, the change in combining ratio becomes steep, and a slow motion effect and large viewpoint movement are combined, enabling a bullet-time effect to be realized. In FIG. 6A, the change amount of the combining ratio until the number of frames T1 is set to 0.1, and the combining ratio until the number of frames T2 is set to 0.9. In other words, the change in combining ratio is set to be eight times higher in the all frame display (slow motion) section than in the thinning display (normal speed) section.

The B_PIX combining ratio is fixed in the thinning display section, and the combining ratio is changed only in the all frame display section, thereby making it possible to further improve the bullet-time effect.

Variation 2

Moreover, in this embodiment, the case in which a moving image is targeted was described, but a still image section in a moving image may also be targeted. For example, in the case where still image shooting is performed during moving image shooting, frames in some of the sections of the moving image may be generated from still images that were shot.

In such a case, regarding the frames generated from the still images (hereinafter, referred to as a still image section) as well, a combining ratio may be temporally changed similarly to moving image frames.

A configuration may also be adopted in which the viewpoint is not changed in the moving image section, and the combining ratio is temporally changed only regarding the still image section, whereby the viewpoint movement effect is imparted.

In addition, the rate of change of the combining ratio may be different between the still image section and the moving image section.

Furthermore, not only in the case where a still image section within a moving image is displayed, but also in the case where still images are continuously displayed as in the case of slide show display of still images, the combining ratio can be temporally changed according to the lapse of the display time.

In other words, the present invention can be applied even to a configuration in which the combining ratio is temporally changed regarding the same frame in a moving image (including a still image).

Variation 3

In addition, the combining processing described in this embodiment can be performed not only on a moving image file that is being recorded but also on a moving image file that was recorded such that an A image and an B image can be obtained.

FIG. 6B schematically shows an example of a data structure of a moving image file that was recorded such that an A image and an B image can be obtained. In the moving image file, a header, a moving image constituted by A_PIX, and a moving image constituted by B_PIX are recorded. In the header, information regarding the total number of frames, file offset of the beginning of the A_PIX moving image and the B_PIX moving image and the like is recorded.

Note that the present invention is not limited to a format in which the A_PIX moving image and the B_PIX moving image are independently recorded, and it is sufficient that a moving image file for generating viewpoint images is recorded. In addition, a combining method and a ratio calculated during shooting may be recorded in the header.

Second Embodiment

Next, a second embodiment of the present invention will be described. This embodiment is different from the first embodiment in that a configuration is provided in which the photoelectric conversion area in a unit pixel is divided in a plurality of directions. That is, in the first embodiment, the photoelectric conversion area in a unit pixel is divided into two horizontally, and is not divided in another direction, for example, the vertical direction.

With the configuration of the first embodiment, viewpoint movement is limited to one straight line, but if the photoelectric conversion area is divided in two or more directions, the degree of freedom of the direction in which the viewpoint is moved increases. The second embodiment relates to imparting a viewpoint movement effect in the case where a unit pixel has 2×2 or more subpixels.

FIG. 2B is a diagram showing the configuration of a unit pixel of the image sensor 102 in this embodiment, similarly to FIG. 2A. In this embodiment, the photoelectric conversion area of the unit pixel is divided into two both horizontally and vertically, and four subpixels 203 to 206 of 1A, 1B, 2A and 2B are provided. Therefore, the digital camera 100 of this embodiment can obtain an image shot from four viewpoints.

The relationship between the centroid positions of the subpixels and the viewpoints of this embodiment will be described with reference to FIGS. 7A to 7D.

In FIG. 7A, reference numerals 1A, 1B, 2A and 2B respectively indicate the centroid positions of the subpixels 203 to 206, and a centroid position 700 positioned in the center indicates a centroid position corresponding to a pixel value obtained by adding the pixel values of 1A, 1B, 2A and 2B in this state (at the same ratio). This matches a centroid position in the case where the photoelectric conversion area of the unit pixel is not divided.

Broken lines in FIG. 7A indicate a range in which the viewpoint can be moved by combining the values of subpixels. Specifically, the viewpoint can be moved within the range of a rectangle whose apexes are the centroid positions of the subpixels.

Here, it is assumed that a viewpoint movement start position 701 is S, and an end position 702 is E. A configuration may be adopted in which these start and end positions can be set by the user, or may be automatically set based on certain information. Here, in order to increase the viewpoint movement amount, the start position 701 and the end position 702 are set on the broken lines, but they do not need to be set on the broken lines.

The image combining unit 105 of this embodiment executes the following processing in step S504 in FIG. 4.

First, the image combining unit 105 obtains a pixel value S at the viewpoint movement start position 701 and a pixel value E at the end position 702 by adding the values 1A, 1B, 2A and 2B of the subpixels 203 to 206 in accordance with Expression (2) and Expression (3) below.

$$S = 1A \times 2\alpha + 2A \times 2 \times (1-\alpha) \quad \text{Exp. (2)}$$

$$E = 1B \times 2\beta + 2B \times 2 \times (1-\beta) \quad \text{Exp. (3)}$$

Here, α indicates the addition ratio of 1A and 2A. The viewpoint moves to the centroid position of the subpixel 203 if α=1, and the viewpoint moves to the centroid position of the subpixel 205 if α=0. Similarly, β indicates the addition ratio of 1B and 2B. The viewpoint moves to the centroid position of the subpixel 204 if β=1, and the viewpoint moves to the centroid position of the subpixel 206 if β=0.

For example, assuming that the distance between 1A and 2A is d, and the distance between 1A and S is d1, α can be obtained from:

$$\alpha = 1 - d1/d.$$

β can be obtained similarly based on the distance between 1B and 2B and the distance between 1B and E.

The image combining unit 105 then changes the addition ratio as in Expression (4) using the pixel values S of the start position 701 and the pixel values E of the end position 702 of viewpoint movement that were obtained as described above, thereby imparting the viewpoint movement effect from the start position 701 to the end position 702.

$$\text{OUT\_PIX} = (2 \times (\text{TotalFrame} - \text{FrameNum}) \times S + 2 \times \text{FrameNum} \times E)/\text{TotalFrame} \quad \text{Exp. (4)}$$

Note that as an example, a configuration was described here in which a unit pixel has four subpixels in total consisting of two subpixels horizontally and two subpixels vertically, but a similar technique can be easily extended to the case of more subpixels as well.

For example, similarly to FIG. 7A, FIG. 7B shows the centroid positions of subpixels regarding a unit pixel that has 3×3 subpixels obtained by equally dividing the unit pixel into three both in the horizontal direction and vertical direction. In FIG. 7B, reference signs 1A, 1B, 1C, 2A, 2B, 2C, 3A, 3B and 3C indicate the centroid positions of the subpixels. Therefore, the digital camera 100 of this embodiment can obtain an image shot from nine viewpoints.

Here, it is possible to apply Expression (4) by obtaining the pixel value S at a start position 703 of viewpoint movement from the pixel values of the subpixels 1A and 2A, and obtaining the pixel value E at an end position 704 from the pixel values of the subpixels 2C and 3C. However, if the pixel value of a shooting viewpoint that is close to a virtual viewpoint is used, a more natural viewpoint movement effect can be imparted. Therefore, a viewpoint movement locus can be sectioned at the intersections between the sides of a rectangle area whose apexes are the shooting viewpoints (the centroid positions of the subpixels) and the viewpoint movement locus, and the combinations of the pixel values to be used for combining processing can be changed every section.

In the example in FIG. 7B, the image combining unit 105 sections the locus between the start position 703 and the end position 704 of viewpoint movement into:
- a first section 720 intersecting the sides of a rectangular area whose apexes are the centroid positions of the subpixels 1A, 2A, 2B and 1B;
- a second section 730 intersecting the sides of a rectangular area whose apexes are the centroid positions of the subpixels 1B, 2B, 2C and 1C; and
- a third section 740 intersecting the sides of a rectangular area whose apexes are the centroid positions of the subpixels 2B, 3B, 3C and 2C.

The image combining unit 105 then executes combining processing, respectively using the following pixel values as the pixel value S at a start position and the pixel value E at an end position in Expression (4):
- the pixel value S at the start position 703 and the pixel value at a position 705 regarding the first section 720;
- the pixel value at the position 705 and the pixel value of a position 706 regarding the second section 730; and
- the pixel value at the position 706 and the pixel value E at the end position 704 regarding the third section 740.

Note that similarly to the pixel value at the start position 701 in FIG. 7A, the pixel value at the position 705 can be obtained from the pixel values of the subpixels 1B and 2B, and the pixel value at the position 706 can be obtained from the pixel values of the subpixels 2B and 2C.

Note that in this embodiment, the case was described in which two points, namely the start position and the end position of viewpoint movement exist on the sides of a rectangle whose apexes are the centroid positions of subpixels, but at least either the start position or the end position may be set inside the rectangle. Alternatively, a start position and an end position set inside a rectangle may be corrected to positions on the sides of a rectangle so as to increase the viewpoint movement amount.

FIG. 7C schematically shows an example of position correction in the case where a start position (S) 707 and an end position (E) 708 of viewpoint movement are set inside a rectangle. As shown in the figure, the image combining unit 105 extends the viewpoint movement locus, namely, a straight line connecting the start position 707 and the end position 708 that are set, and uses the intersections with the sides of the rectangle as a corrected start position (CS) 709 and end position (CE) 710 of viewpoint movement, respectively. Such correction can be easily realized by obtaining the intersections between a straight line passing through the start position 707 and the end position 708 that are set and the sides of the rectangle.

Moreover, even if a start position and an end position of viewpoint movement are set on the sides of a rectangle whose apexes are the centroid positions of subpixels as in the case of a start position (S) 711 and an end position (E) 712 shown in FIG. 7D, the movement distance may be short. For example, in the case where the viewpoint movement distance is less than a predetermined threshold value (e.g., the distance between the centroid positions of adjacent subpixels in the division direction), the image combining unit 105 can correct the movement distance to be larger than or equal to the threshold value.

For example, while maintaining the inclination of the viewpoint movement locus between the start position (S) 711 and the end position (E) 712, one position out of those positions can be moved to the centroid position of a subpixel and the locus can be extended so as to determine the other position. In an example of FIG. 7D, the start position (S) 711 can be moved to the centroid position of the subpixel 1A to serve as a corrected start position (CS) 713, and the intersection between the extended line of the locus and the side of the rectangle can serve as a corrected end position (CE) 714.

The corrected start position and end position may also be determined, such that the straight line that connects the corrected start position and end position passes through the center of the rectangle (the centroid position of the photoelectric conversion area of the unit pixel).

According to this embodiment, in the case where the photoelectric conversion area of a unit pixel is divided in a plurality of directions, the pixel values of the start position and end position of viewpoint movement are calculated from the values of a plurality of nearby subpixels, and the combining ratio is controlled similarly to the first embodiment. Accordingly, an effect similar to the first embodiment can be realized.

Third Embodiment

Next, a third embodiment of the present invention will be described. As described with reference to FIG. 3, in the parallax images used in the above-described embodiments, an area that is not in focus has a large parallax amount, and an area that is in focus has a parallax amount of 0. Therefore, the viewpoint movement effect that can be imparted in the first and second embodiments mainly involve background areas. In the third embodiment, the viewpoint movement effect is imparted to an in-focus area.

FIG. 8A is a block diagram schematically showing an example of the functional configuration of a digital camera 800 according to the third embodiment, and the same reference signs are assigned to the same constituent elements as the first embodiment. This embodiment is different from the first embodiment in that the digital camera 800 of this embodiment has a reconstruction processing unit 801 for applying pixel shifting processing to parallax images output by the readout unit 104. Note that in this embodiment, a unit pixel of the image sensor 102 is constituted to include 2×2 subpixels shown in FIG. 2B.

Pixel shifting processing performed by the reconstruction processing unit 801 will be described with reference to parallax images shown in FIG. 8B. FIG. 8B schematically shows images each constituted by the output of a group of the same type of subpixels (a group of subpixels 1A, a group of subpixels 1B, a group of subpixels 2A, and a group of subpixels 2B) output by the readout unit 104. As described above, the subpixels have different shooting viewpoints, and thus the four images are parallax images having different shooting viewpoint positions.

A camera that uses an image sensor having a configuration in which one microlens is shared by a plurality of subpixels is called a light field camera or a plenoptic camera, and by combining (reconstructing) a plurality of parallax images, an image in which an in-focus position is different from that during shooting can be generated after shooting. A reconstructed image that has undergone an operation of changing the in-focus position (refocusing) in this manner is called a refocused image.

The principle of refocusing will be described briefly. Assume that in the four parallax images shown in FIG. 8B, the parallax amount at the position of flowers is not 0, or in other words, that the flowers were not in focus during shooting. If these four parallax images are combined after being aligned (pixels are shifted) such that the parallax amount at the position of the flowers is 0, an image in which the flowers are in focus is obtained.

The parallax amount is 0 in an in-focus portion as described with reference to FIG. 3. At this time, a parallax amount regarding a subject (in this case, leaves) having a degree of focusing higher than the flowers during shooting is greater than the parallax amount during shooting, and a state in which blur is greater than during shooting occurs. On the other hand, in the case of aligning (shifting the pixels) and combining the parallax images such that the parallax amount at the position of the leaves is 0, an image in which the leaves are in focus is now obtained, and the degree of focusing of the flowers decreases. By shifting the pixel positions and combining parallax images in this manner, a reconstructed image (refocused image) having different in-focus positions can be generated.

Using this principle, the reconstruction processing unit 801 shifts the positions of the parallax images and combines those images such that the degree of focusing of an area that was in focus during shooting decreases (blur occurs), and generates a reconstructed image. By executing the processing of the first or second embodiment using such a reconstructed image, the viewpoint movement effect can then be imparted to an area that was in focus during shooting.

Note that in the case where a pixel shifting amount (shifting amount) when the reconstruction processing unit 801 generates a reconstructed image is increased, the contour of the subject may be doubly blurred, but such a problem can be suppressed by setting the pixel shifting amount based on a range in which refocusing is possible.

The range in which refocusing is possible is determined from the depth of focus. Assuming that the aperture value of the imaging optical system is F, and a circle of confusion diameter limit is $\delta$, the depth of focus is the range of an image forming position $\pm F\delta$. In this case, in a configuration in which the unit pixel has 2×2 subpixels, a defocus amount of $\pm 2F\delta$ is the range in which refocusing is possible. Therefore, the reconstruction processing unit 801 can generate a reconstructed image based on the aperture value during shooting and the circle of confusion diameter limit of the image sensor 102, in the range of the pixel shifting amount corresponding to the defocus amount of $\pm 2F\delta$. A method for obtaining the pixel shifting amount corresponding to the defocus amount of $\pm 2F\delta$ is known in an automatic focus detection technique of a phase difference detection method, and thus description thereof is omitted here.

The effect of reconstruction processing will be described with reference to FIGS. 9A and 9B.

FIG. 9A shows waveform examples of a 1A image and a 1B image in an in-focus area that were obtained regarding a certain subject, and waveform examples of a combined image obtained by combining (adding) the 1A image and the 1B image at different ratios (weights). The horizontal axis indicates the pixel position in the horizontal direction, and the vertical axis indicates the pixel value. The local maximum positions of the 1A image and the 1B image are the same, since those images are in-focus areas. Therefore, if a combined image is generated without using reconstruction processing, the local maximum position of the combined image does not change even if the combining ratio is changed.

FIG. 9B shows, similarly to FIG. 9A, a waveform chart in the case where an A image is generated with the in-focus position of the 1A image being shifted using reconstruction processing. Here, pixel shifting for four pixels is performed and a reconstructed image is generated. In this manner, it can be seen that by using an image to which pixel shifting processing has been applied, the local maximum position of the combined image changes in accordance with the combining ratio of the A image and the 1B image, or in other words, the viewpoint movement effect can be imparted.

Note that this embodiment can be used in combination with the contents described in the first embodiment.

For example, a configuration may be adopted in which, in cases such as where a moving image is shot in which a subject is finally focused after the focus is moved by autofocus, or where the subject stops at a preset fixed focal distance, a section in which the subject exists in the focal plane is detected, only that section is refocused, and the combining ratio (viewpoint position) is changed.

A configuration may also be adopted in which while temporally changing the combining ratio, refocusing is applied and parallax between A_PIX and B_PIX is added to the section in which the subject exists in the focal plane.

According to this embodiment, a reconstructed image in which the degree of focusing of an area that was in focus during shooting is decreased is generated, and combining processing similar to that in the first and second embodiments is implemented, whereby the viewpoint movement effect can be imparted to the area that was in focus during shooting.

Fourth Embodiment

In the first to third embodiments, a configuration in which an A image and a B image are obtained using an image sensor having a subpixel structure was described.

In a fourth embodiment, a configuration in which the present invention is applied to parallax images obtained by using a plurality of normal image sensors that do not have a subpixel structure will be described.

FIG. 10 shows an example of the functional configuration of a multi-eye camera 300 that is used in this embodiment and can obtain parallax images. An image capture apparatus 300 has three sets A to C of the optical system unit 101, an image sensor 301, the A/D conversion unit 103 and the readout unit 104, and has a configuration in which imaging signals are input from readout units 104A to 104C to an image combining unit 302. Note that the image sensor 301 is a Bayer-type image sensor constituted to have one photoelectric conversion portion for one microlens. Moreover, optical system units 101A to 101C are arranged so as to not have parallax in the vertical direction and to mutually have a predetermined parallax in the horizontal direction, for example, and parallax images shot at three viewpoints are output from the readout units 104A to 104C.

In addition, the image combining unit 302 is a combining unit that can obtain a viewpoint image by combining two of these three parallax images. The combining method is the same as the case of applying viewpoint movement in only the horizontal direction in FIG. 7B as described in the second embodiment, and thus description thereof is omitted.

Note that in the case of a multi-eye image capture apparatus, as shown in FIG. 11, the distances between the optical axes of the optical system units 101A to 101C in the horizontal direction with respect to a subject 403 may not be equal. In such a case, the combining ratio is corrected in accordance with inter-optical axis distances VA and VB of the optical system units 101A to 101C.

In this manner, the combining method described in the first to third embodiments can also be applied to parallax images obtained by a multi-eye image capture apparatus.

Fifth Embodiment

In a fifth embodiment, the case in which a viewpoint movement effect can be effectively obtained by changing a combining ratio in accordance with the state of the subject and the state of the image capture apparatus will be described.

FIG. 12 shows an example of a combining ratio that is corrected in accordance with the state of the subject. Similarly to FIG. 6A, the vertical axis indicates a B_PIX combining ratio, and the horizontal axis indicates the number of frames (or time).

Here, the subject does not appear in the initial frames, and the subject then appears in a frame S1 and fades out in a frame S2 to end the moving image. Note that the subject here is a suitable subject that has a feature detectable in a shot image, and may typically be a face of a person, but may be an image area designated by the user. The image combining unit 105 can execute subject detection based on a known technique.

In a moving image in which the state of the subject temporally changes in this manner, the combining ratio can be changed at a timing at which the state of the subject changes. For example, information for specifying a timing at which (a frame in which) the subject became detectable and a timing at which (a frame in which) the subject can no longer be detected can be recorded in a header portion of a moving image file, for example.

In the case of reproducing the moving image file in which such information is recorded, the combining ratio can be changed such as by increasing a viewpoint movement amount per unit of time in a section in which the subject has not been detected to be greater than a section in which the subject has been detected. Accordingly, also in a section in which there is no subject, it becomes possible to maintain the user's interest. In addition, in a state in which a subject is displayed, it is possible to focus the user's interest on the subject by decreasing the viewpoint movement amount.

Note that the combining ratio (the viewpoint movement effect) change amount per unit of time may be dynamically changed in accordance with the state of the image capture apparatus instead of the state of the subject, for example.

For example, in the case of performing a panning operation between the frame S1 and the frame S2, the viewpoint movement effect will be difficult to perceive during the panning operation.

Therefore, by relatively decreasing the combining ratio (the viewpoint movement effect) change amount per unit of time during the panning operation compared with that when the panning operation is not being performed, it becomes possible to effectively use the limited viewpoint movement amount.

Moreover, conversely, by increasing the combining ratio (the viewpoint movement effect) change amount per unit of time during the panning operation to be greater than that when the panning operation is not being performed, it is possible to add an effect that makes it appear as if the panning operation is being performed quickly. Here, whether or not the panning operation is performed was described as an example of controlling the combining ratio (the viewpoint movement effect) change amount per unit of time in accordance with the orientation of the image capture apparatus, but the combining ratio change amount per unit of time can also be controlled based on another state of the image capture apparatus.

By changing the combining ratio (the viewpoint movement effect) change amount per unit of time in accordance with the state of the subject or the image capture apparatus as described above, a more effective viewpoint movement effect can be realized.

Other Embodiments

Note that in the above embodiments, the viewpoint movement effect is obtained by changing the addition ratio of an A image and a B image obtained from subpixels that share one microlens. Accordingly, it becomes possible to suppress the occurrence of a doubly blurred contour in a combined image, unlike the case in which parallax images obtained using a multi-eye digital camera are mutually combined. However, the viewpoint movement effect can also be realized by using a plurality of parallax moving image data pieces obtained such as by using a multi-eye digital camera as a method for moving the viewpoint.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-116025, filed on Jun. 8, 2015 and 2016-094155, filed on May 9, 2016 which are hereby incorporated by reference herein in their entirety.

The invention claimed is:

1. An image processing apparatus comprising:
at least one processor; and
a memory storing an instruction which, when the instruction is executed by the at least one processor, causes the at least one processor to function as:
an obtaining unit configured to obtain a plurality of parallax images, wherein each of the parallax images comprise a plurality of frames;
a combining unit configured to combine the plurality of parallax images in units of frames in accordance with a combining ratio and generating moving image data of which frames include images obtained by the combining; and
a control unit configured to control the combining ratio, wherein the control unit controls the combining ratio so as to temporally change in the moving image data.

2. The image processing apparatus according to claim 1, wherein
the plurality of parallax images are those shot by a multi-eye camera.

3. The image processing apparatus according to claim 1, wherein the obtaining unit sequentially obtains the plurality of parallax images output from an image sensor in which unit pixels each having a plurality of subpixels that share a microlens are two-dimensionally arranged.

4. The image processing apparatus according to claim 1, wherein
the control unit controls the combining ratio such that the combining ratio changes in a predetermined range in a predetermined number of frames or a predetermined time.

5. The image processing apparatus according to claim 1, wherein
the control unit dynamically changes a change amount of the combining ratio.

6. The image processing apparatus according to claim 1, wherein
the control unit dynamically changes a change amount of the combining ratio in accordance with a relationship between a frame rate of the moving image data and a display frame rate.

7. The image processing apparatus according to claim 1, wherein
the control unit dynamically changes a change amount of the combining ratio in accordance with a state of a subject or the obtaining unit.

8. The image processing apparatus according to claim 7, wherein
the state of a subject is detection/non-detection of the subject.

9. The image processing apparatus according to claim 7, wherein
the state of the obtaining unit is an orientation of the obtaining unit.

10. The image processing apparatus according to claim 1, wherein
the control unit controls the combining ratio such that the combining ratio changes linearly.

11. The image processing apparatus according to claim 1, wherein
the control unit controls the combining ratio based on a relationship between a start position and an end position of viewpoint movement that are set in advance and shooting viewpoint positions of the plurality of parallax images.

12. The image processing apparatus according to claim 11, wherein the start position and the end position are equal to the shooting viewpoint positions of the plurality of parallax images.

13. The image processing apparatus according to claim 11, wherein
the start position and the end position exist on a side of a rectangle whose apexes are the shooting viewpoint positions of the plurality of parallax images.

14. The image processing apparatus according to claim 11, wherein
the start position and the end position exist on different sides of a rectangle whose apexes are the shooting viewpoint positions of the plurality of parallax images.

15. The image processing apparatus according to claim 11, wherein execution of the instruction by the at least one processor causes the at least one processor to further function as:
a correction unit configured to correct whichever of the start position and the end position exists inside a rectangle whose apexes are the shooting viewpoint positions of the plurality of parallax images to a position existing on a side of the rectangle.

16. The image processing apparatus according to claim 15, wherein
the correction unit performs the correcting such that a distance between the start position and the end position is greater than or equal to a predetermined threshold value.

17. The image processing apparatus according to claim 11, wherein
the combining unit uses, as the plurality of parallax images, moving image data in which the start position is a shooting viewpoint position and moving image data in which the end position is a shooting viewpoint position.

18. The image processing apparatus according to claim 17, wherein
the combining unit generates at least one of an image of which shooting viewpoint position is the start position and an image of which shooting viewpoint position is the end position, from the plurality of parallax images, and uses the generated image in the combining.

19. The image processing apparatus according to claim 1, wherein execution of the instruction by the at least one processor causes the at least one processor to further function as:
a reconstruction unit configured to generate, from the plurality of parallax images, a reconstructed image in which an in-focus area is different from an in-focus area during shooting,
wherein the combining unit uses the reconstructed image in the combining.

20. The image processing apparatus according to claim 19, wherein
the reconstruction unit generates the reconstructed image by shifting positions of a plurality of frame images that have different shooting viewpoint positions and combining the shifted frame images.

21. An image capture apparatus comprising:
an image processing apparatus that comprises:
at least one processor; and
a memory storing an instruction which, when instruction is executed by the at least one processor, causes the at least one processor to function as:
an obtaining unit configured to obtain a plurality of parallax images, wherein each of the parallax images comprise a plurality of frames;
a combining unit configured to combine the plurality of parallax images in units of frames in accordance with a combining ratio and generating moving image data of which frames include images obtained by the combining; and
a control unit configured to control the combining ratio, wherein the control unit controls the combining ratio so as to temporally change in the moving image data,
wherein the obtaining unit has an image sensor.

22. An image processing method comprising:
obtaining a plurality of parallax images, wherein each of the parallax images comprise a plurality of frames;
combining the plurality of parallax images in units of frames in accordance with a combining ratio and generating moving image data in which an image obtained by the combining is included in frames; and
controlling the combining ratio,
wherein in the controlling, the combining ratio is controlled so as to temporally change in the moving image data.

23. The image processing method according to claim 22:
wherein the obtaining sequentially obtains the plurality of parallax images output from an image sensor in which unit pixels each having a plurality of subpixels that share a microlens are two-dimensionally arranged.

24. A non-transitory computer-readable storage medium storing a program for causing a computer to function as an image processing apparatus comprising:
an obtaining unit configured to obtain a plurality of parallax images, wherein each of the parallax images comprise a plurality of frames;
a combining unit configured to combine the plurality of parallax images in units of frames in accordance with a combining ratio and generating moving image data of which frames include images obtained by the combining; and
a control unit configured to control the combining ratio, wherein the control unit controls the combining ratio so as to temporally change in the moving image data.

* * * * *